(12) United States Patent
Kim et al.

(10) Patent No.: US 7,359,352 B2
(45) Date of Patent: Apr. 15, 2008

(54) APPARATUS AND METHOD FOR PROCESSING DATA CALL IN PRIVATE WIRELESS HIGH-SPEED DATA SYSTEM

(75) Inventors: Soo-Hwan Kim, Gyeonggi-do (KR); Jun-Hyuk Lee, Suwon-si (KR); Doo-Yong Yang, Seoul (KR); Tai-Yoon Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 636 days.

(21) Appl. No.: 10/826,412

(22) Filed: Apr. 19, 2004

(65) Prior Publication Data

US 2004/0229614 A1    Nov. 18, 2004

(30) Foreign Application Priority Data

Apr. 29, 2003    (KR) .................. 10-2003-0027334

(51) Int. Cl.
*H04Q 7/00* (2006.01)
*H04Q 7/20* (2006.01)

(52) U.S. Cl. .......... 370/331; 455/456.1; 455/436; 455/438; 455/439; 370/332; 370/333; 370/315

(58) Field of Classification Search ......... 455/456.1–6, 455/436–444, 432.1–433, 432; 370/331–333
See application file for complete search history.

(56) References Cited

U.S. PATENT DOCUMENTS 5,818,824 A    10/1998    Lu et al.
6,704,569 B2 *    3/2004    Larson .................. 455/426.1
2002/0067707 A1 *    6/2002    Morales et al. ............. 370/331
2003/0135626 A1 *    7/2003    Ray et al. .................... 709/228
2003/0145091 A1 *    7/2003    Peng et al. .................. 709/229
2003/0223427 A1    12/2003    Chang et al.
2004/0048601 A1    3/2004    Lee et al.

FOREIGN PATENT DOCUMENTS

| JP | 2002-300644 | 10/2002 |
|---|---|---|
| JP | 2002-345019 | 11/2002 |
| JP | 2003-92782 | 3/2003 |
| JP | 2003-259424 | 9/2003 |
| WO | WO03/003588 | 1/2003 |
| WO | WO03/061219 | 7/2003 |

* cited by examiner

*Primary Examiner*—Duc M. Nguyen
*Assistant Examiner*—Daniel Lai
(74) *Attorney, Agent, or Firm*—Robert E. Bushnell, Esq.

(57) ABSTRACT

An apparatus and method for processing a data call in a private EV-DO wireless network system construct a data location register (DLR) and AN_AAA, which are essential to an EV-DO wireless network configuration, in a private EV-DO wireless network to block an EV-DO terminal from maintaining a public network session and allow the EV-DO terminal to maintain only a private network session within a private area in building the private EV-DO wireless network in an area where security is required, so that the public network connection is not established. Thus, it is possible to prevent information outflow through the Internet with a public EV-DO wireless network connection, to limit private service with respect to a terminal having no permission, and to block in advance illegal information outflow through the Internet with a private EV-DO wireless network connection.

23 Claims, 6 Drawing Sheets

FIG. 6

DATA FIELD 1 data representing receiving a unicast access terminal identifier request message from a terminal entering a private evolution data only wireless network, the unicast access terminal identifier request message including a unicast access terminal identifier, old unicast access terminal identifier, allocated in a public evolution data only wireless network

DATA FIELD 2 data representing determining whether the old unicast access terminal identifier included in the received unicast access terminal identifier request message is unicast access terminal identifier allocated in the private evolution data only wireless network

DATA FIELD 3 data representing when it is determined that the unicast access terminal identifier included in the sent unicast access terminal identifier request message is not the unicast access terminal identifier allocated in the private evolution data only wireless network, closing a public evolution data only wireless network session established with the terminal

DATA FIELD 4 data representing when a unicast access terminal identifier request message including random unicast access terminal identifier information is received from the terminal after the session has been closed, allocating a new unicast access terminal identifier according to the received random unicast access terminal identifier information, establishing a private evolution data only wireless network session with the terminal, and storing the session in a database

DATA FIELD 5 data representing when the new private evolution data only wireless network session is established, sending an authentication request signal to the terminal

APPARATUS AND METHOD FOR PROCESSING DATA CALL IN PRIVATE WIRELESS HIGH-SPEED DATA SYSTEM

CLAIM OF PRIORITY

This application makes reference to, incorporates the same herein, and claims all benefits accruing under 35 U.S.C. §119 from an application for APPARATUS AND METHOD FOR PROCESSING A DATA CALL IN A PRIVATE WIRELESS HIGH-SPEED DATA SYSTEM earlier filed in the Korean Intellectual Property Office on 29 Apr. 2003 and there duly assigned Serial No. 2003-27334.

BACKGROUND OF THE INVENTION

1. Field of the Invention

The present invention relates to an apparatus and method for processing a data call in a private wireless high-speed data system and, more particularly, to an apparatus and method for processing a data call in a private wireless high-speed data system in which when there is a call connection to a private wireless high-seed data system network of which the security is required with a wireless terminal of a wireless high-speed data system (i.e., CDMA 1× EV-DO) scheme, the connection to the private EV-DO wireless network is allowed but the connection to a public EV-DO wireless network is blocked.

2. Description of the Related Art

Generally, a CDMA 1× EV-DO (code division multiple access 1× evolution data only (sometimes also called evolution data optimized), hereinafter, referred to as EV-DO) wireless network is a new packet wireless data transmission technology developed using a CDMA technology by QUALCOMM, which allows mega class high-speed data transmission. The EV-DO wireless network has a maximum transmission speed of 2.4 Mbps (megabits per second) in a forward direction and 307.2 Kbps in a backward direction, which is the same transmission speed as that in an asymmetric digital subscriber line (ADSL) scheme used in a wired network.

The advent of the EV-DO is because the 1× RTT system of an IMT-2000 MC (Multi-Carrier; synchronous), which has been developed to support both voice and data and has been tested for commercial use, has a limit in high-speed data transmission of 1.25 MHz (megahertz) bandwidth and also does not support data transmission of 144 Kbps or more in an IS-95 (Telecommunication Industry Association (TIA)/Electronic Industry Alliance (EIA) IS-95) scheme. That is, the EV-DO has appeared as a supplementary solution for the high-speed data transmission.

The EV-DO provides a connection to the data dedicated Internet over a data core network (DCN) in an existing IS-95 network. It can support the same data transmission speed as an existing one, even in the third generation (3G) network.

The EV-DO has an average forward transmission speed allowing high-speed data communication of several hundred kbps. Notwithstanding, the used radio frequency bandwidth is 1.25 MHz, which is the same as a mobile phone used in a current CDMA One.

Considering that a bandwidth of 5 MHz is required to provide 384 bps service in the IMT-2000, the system is regarded as a system of high frequency usage efficiency.

That is, the EV-DO has been designed in a manner suitable for data communication that is not affected by delay or instant when transfer data is burst data as in the Internet, realizing the high-speed transmission with a frequency bandwidth narrower than that of the IMT-2000.

Further, the EV-DO performs a function of automatically adjusting backward transmission speed at a base station side according to communication quality between a terminal and a base station. This function is realized by monitoring a signal from the terminal received at the base station per 1.67 m/s to recognize the communication quality and by adjusting data transmission priority and speed with the terminal.

It improves data communication quality by preferentially increasing transmission speed for a terminal in the vicinity of the base station where electric wave interference is less while by reducing communication speed for a terminal located far from the base station.

A typical wireless network is classified into a wireless public network and a wireless private network, which is used at groups, companies, or the like having a particular purpose. The wireless private network is configured to interwork with a particular wireless public network. On the other hand, in the above-described EV-DO wireless network, there exists only public EV-DO wireless network service provided by a mobile communication service provider while there is no private EV-DO wireless network service, unlike the typical wireless network.

Thus, it is a trend that methods are being developed which use a part of a public EV-DO wireless network as a private EV-DO wireless network. These methods allow one mobile terminal to be served by the private EV-DO wireless network in a particular region (private region) while by the public EV-DO wireless network in other regions.

One of these methods was proposed in the Korean patent application No. 10-2002-0054625 filed on Sep. 10, 2002 by the same applicant and entitled "Method and System for Using in Common a Public Network and a Private Network in a Wireless High-speed Data System".

The proposed "method and system for using in common a public network and a private network in a wireless high-speed data system" will be simply discussed. Among methods for implementing a private EV-DO wireless network (private network) in an EV-DO network, the following methods have been suggested therein in configuring DLR (data location register) and AN_AAA (access network authentication accounting authorization) essential to the EV-DO configuration.

First, in the case of the DLR, there is a scheme of handling private network connection by allowing a direct connection to the public network DLR in order to configure the private network or by disposing a private dedicated DLR in the private network. Further, in the case of the AN_AAA, private authentication is handled by allowing a direct connection to the public network AN_AAA in order to handle private network connection authentication or by disposing a private dedicated AN_AAA in a private network, as in the DLR.

However, although such methods have advantages in their own way, the methods are not suitable for a region of which the security is required, namely, a private EV-DO wireless network as they allow a free connection from the private EV-DO wireless network to the public EV-DO wireless network. In particular, there is a problem with a direct connection scheme to the public EV-DO wireless network DLR in that building private EV-DO wireless network service is impossible because paging to the private EV-DO wireless network is not accomplished.

SUMMARY OF THE INVENTION

It is, therefore, an object of the present invention to provide an apparatus and method for processing a data call in a private wireless high-speed data system in which, when a wireless terminal of a CDMA 1× EV-DO scheme enters a private EV-DO wireless network and makes a call connection to the private EV-DO wireless network, the security maintenance of the private EV-DO wireless network is efficiently performed by allowing the call connection to the private EV-DO wireless network to be established while the call connection to the public EV-DO wireless network to be blocked.

Thus, it is possible to prevent information outflow through the Internet with a public EV-DO wireless network connection, to limit private service with respect to a terminal having no permission, and to block in advance illegal information outflow through the Internet with a private EV-DO wireless network connection.

It is another object of the apparatus and method for processing a data call in the private EV-DO wireless network system according to the present invention, independently constructing DLR and AN_AAA, which are essential to an EV-DO wireless network configuration, in a private EV-DO wireless network to block an EV-DO terminal from maintaining a public network session and allow the EV-DO terminal to maintain only a private network session within a private area in building the private EV-DO wireless network in an area where security is required, so that the public network connection is not established.

It is yet another object in the apparatus and method for processing a data call in the private EV-DO wireless network system with an existing public network session that is easy to implement and efficient in providing security for the private network session.

According to the present invention for achieving the above and other objects, there is provided an apparatus for processing a data call in a private EV-DO wireless network system, including: relay means for relaying a UATI (unicast access terminal identifier) request message when the UATI request message is received from a terminal entering a private EV-DO wireless network, the UATI request message including a public network UATI (oldati) allocated in a public EV-DO wireless network; call processing means for: a) generating a new private EV-DO wireless network UATI request signal in response to the UATI request message relayed by the relay means, and, when a UATI response message (Unknown UATI) corresponding to the UATI request signal is received, closing a session created at the terminal and the public network according to the received message, and b) relaying a new UATI request message provided from the terminal through the relay means, the new UATI request message including random UATI information, and sending an authentication request signal to the connection terminal through the relay means when a private network session is established with the terminal according to a newly allocated UATI; and session information processing means for providing a UATI response message to the call processing means in response to the private EV-DO wireless network UATI request signal generated from the call processing means, allocating the new UATI to the connection terminal according to the relayed new UATI request message from the call processing means to establish the private EV-DO wireless network session with the terminal, and then storing the established session information in a database of the session information processing mean.

The apparatus further may include authentication means connected to the call processing means for: when NAI (network access identifier) information for authentication is received through the call processing means from the terminal, authenticating based on the corresponding NAI information whether the corresponding connection terminal is a terminal registered in the private EV-DO wireless network; and sending a mobile node identifier (MN ID) value as a return value to the terminal through the call processing means and the relay means, and providing the mobile node identifier (MN ID) value of the connection terminal to the session information processing means to be stored along with the session information in the database of the session information processing means.

When a call connection request signal is received from the terminal entering the private EV-DO wireless network in a state where the new private network session has been established with the terminal, the session information processing means provides the call processing means with the private EV-DO wireless network session information of the corresponding connection terminal stored in the database.

When a call connection request signal is received from the terminal entering the private EV-DO wireless network in a state where the new private network session with the terminal has been established, the call processing means establishes a traffic channel to the connection terminal according to the private EV-DO wireless network session information of the corresponding connection terminal provided from the session information processing means.

The call processing means may include a routing module for: when a call connection request signal is received through the relay means from the terminal entering the private EV-DO wireless network in a state where the new private network session with the terminal has been established, determining, based on temporary identifier information contained in the call connection request signal, whether a corresponding terminal connection call is a private EV-DO wireless network connection call or a public EV-DO wireless network connection call, and routing the corresponding connection call to the private EV-DO wireless network or the public EV-DO wireless network according to the determining result.

The apparatus may include a data packet service node for providing data service over the Intranet in the private EV-DO wireless network to the corresponding terminal through the call processing means when a traffic channel to the corresponding terminal is allocated from the call processing means and call processing is implemented.

Meanwhile, there is provided a method for processing a call in a private EV-DO wireless network system, the private EV-DO wireless network system being interworked with a public EV-DO wireless network system including a public data location register, the private EV-DO wireless network system including a private base station, a private control station, a private data location register, a private authentication processor and a data service node, the method including: a first step of sending, by the private base station, a UATI request message that is sent from a terminal entering a private EV-DO wireless network, to the private data location register through the private control station, the UATI request message including UATI (oldati) allocated in the public EV-DO wireless network when the UATI request message is received; a second step of analyzing whether the UATI included in the UATI request message sent through the private control station is UATI allocated by the data location register, and sending to the private control station a UATI response message for notifying that it is not the UATI allocated by the data location register when it is not the UATI allocated by the data location register, by the data location register; a third step of closing, by the private control station receiving the UATI response message sent from the private data location register, a session created in the terminal and the public EV-DO wireless network in response to the received UATI response message; a fourth of allocating a new UATI, establishing a private EV-DO wireless network session with the terminal, and storing the session in a database of the private data location register, by the private data location register, when a UATI request message including random UATI information from the terminal is sent through the private base station and the private control station to the private data location register after the session has been closed; and a fifth step of performing, by the private authentication processor, private authentication of the terminal using a mobile node identifier (MN ID) value sent from the terminal when the new private network session is established, and then storing the mobile node identifier (MN ID) value of the corresponding terminal along with session information in a database of the private data location register.

The method may include a sixth step of, when there is a call connection request from the terminal entering the private EV-DO wireless network in a state where the private network session with the terminal has been established through the first to fifth steps, sending a call connection request signal from the terminal to the private control station, by the private base station; a seventh step of determining, by the private control station, whether the call connection request signal sent from the private base station is a private EV-DO wireless network connection request signal or a public EV-DO wireless network connection request signal; an eighth step of requesting, by the private control station, session information to the private data location register when the connection request signal from the corresponding terminal is the private EV-DO wireless network connection request signal; a ninth of retrieving, by the private data location register, session information of the corresponding terminal stored in the database of the private data location register to send the session information to the private control station; and a tenth of allocating a traffic channel to the terminal using the session information sent from the private data location register, and performing data service over the allocated traffic channel, by the private control station.

The method may include the steps of: when it is determined in the seventh step that the call connection request signal sent from the private base station is the public EV-DO wireless network connection request signal, sending, by the private control station, the session information request signal of the corresponding terminal according to the call connection request signal, to the data location register in the public EV-DO wireless network; determining, by the public data location register, whether the session information of the corresponding terminal is the session information allocated in the public EV-DO wireless network in response to the session information request which sent through the private control station in the private EV-DO wireless network; when the session information of the terminal is not the session information allocated in the public EV-DO wireless network, providing to the private control station a response message (Unknown UATI) notifying that the session information of the corresponding terminal is not the session information allocated by the public EV-DO wireless network; and closing, by the private control station, the private network session with the terminal to block a connection to the public network in response to a response message provided from the data location register in the public EV-DO wireless network.

Meanwhile, there is provided a method for processing a call in a private EV-DO wireless network system, including the steps of: receiving a UATI request message from a terminal entering a private EV-DO wireless network, the UATI request message including a UATI (old uati) allocated in a public EV-DO wireless network; determining whether the old uati included in the received UATI request message is UATI allocated in the private EV-DO wireless network; when it is determined that the UATI included in the sent UATI request message is not the UATI allocated in the private EV-DO wireless network, closing a public EV-DO wireless network session established with the terminal; when a UATI request message including random UATI information is received from the terminal after the session has been closed, allocating a new UATI according to the received random UATI information, establishing a private EV-DO wireless network session with the terminal, and storing the session in a database; and when the new private EV-DO wireless network session is established, sending an authentication request signal to the terminal, and when an MNID value of the terminal needed for authentication is received from the terminal, performing private authentication for the corresponding terminal using the received MN-ID of the terminal, and then storing the mobile node identifier (MN ID) value of the corresponding terminal along with the session information in the database.

The method may include the steps of: when there is a call connection request from the terminal entering the private EV-DO wireless network in a state where private session has been established with the terminal, determining whether a corresponding call connection request signal is a private EV-DO wireless network connection request signal or a public EV-DO wireless network connection request signal; retrieving session information of the corresponding terminal stored in the database when it is determined that the connection request signal from the corresponding terminal is the private EV-DO wireless network connection request signal; and allocating a traffic channel to the terminal according to the retrieved session information of the corresponding terminal and performing data service through the allocated traffic channel.

The method may include the steps of: when the call connection request signal from the terminal is the public EV-DO wireless network connection request signal, requesting the public EV-DO wireless network to provide a session information request signal of a corresponding terminal according to the call connection request signal; and when receiving, from the public EV-DO wireless network, a response message indicating that the session information of the corresponding terminal is not the session information allocated in the public EV-DO wireless network in response to the request, closing the private network session with the terminal to block the connection to the public network in response to the response message provided from the public EV-DO wireless network.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 6 is an example of the data structure of the computer-readable medium of FIG. 5.

DETAILED DESCRIPTION OF THE PREFERRED EMBODIMENTS

Hereinafter, preferred embodiments of an apparatus and method for processing a data call in a private wireless high-speed data system will be described in detail with reference to the accompanying drawings.

Figure 1:
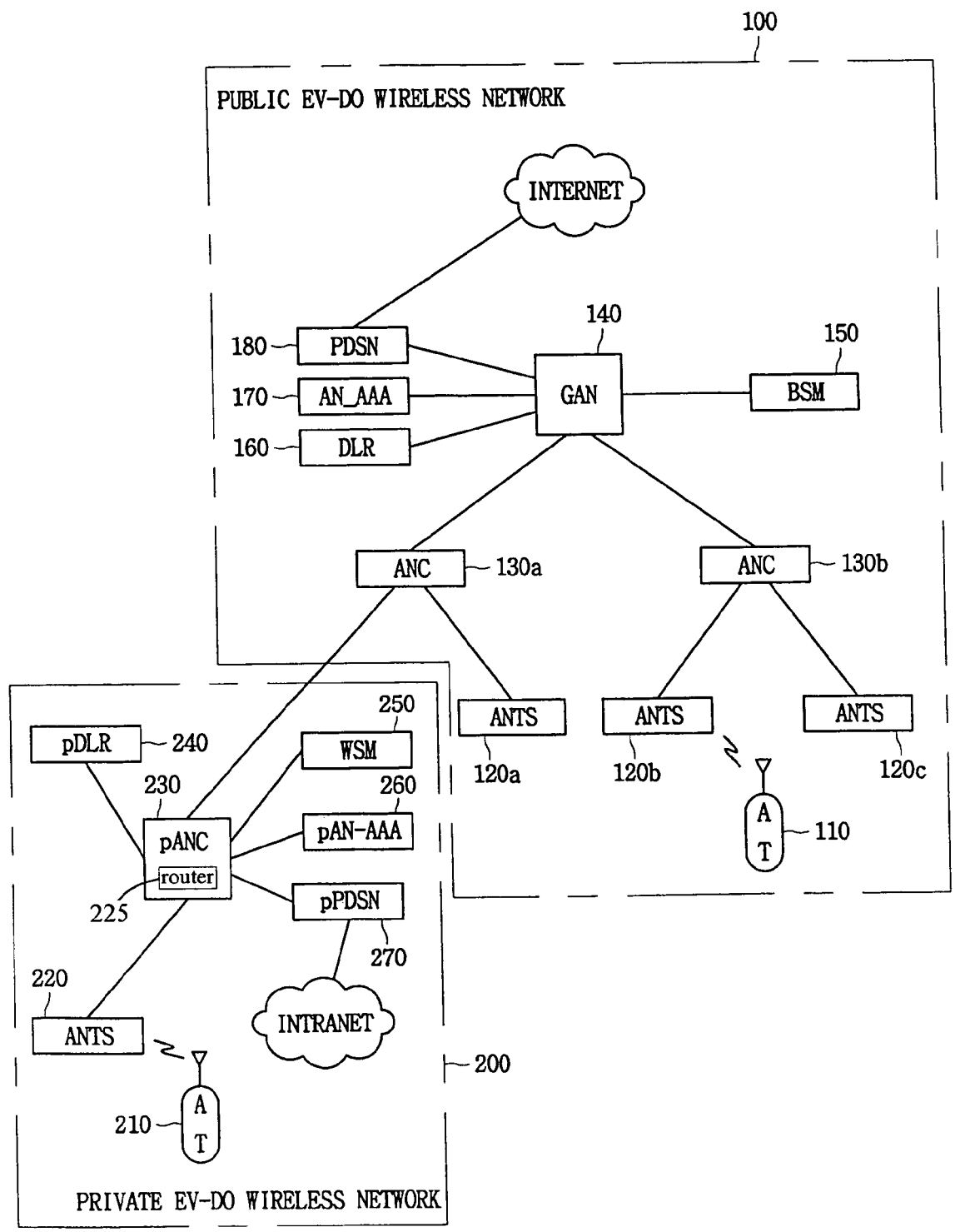
FIG. 1 is a view illustrating a network connection configuration with a public wireless high-speed data system for implementing an apparatus for processing a data call in a private wireless high-speed data system according to the present invention.

FIG. 1 is a view illustrating a network connection configuration with a public wireless high-speed data system for implementing an apparatus for processing a data call in a private wireless high-speed data system according to the present invention. In connection with the configuration and operation thereof, the configuration of a public EV-DO wireless network 100 and a private EV-DO wireless network 200 will be separately discussed.

First, as shown in FIG. 1, an access terminal (AT) 110 in the public EV-DO wireless network 100 is a terminal that can be used in common in the public EV-DO wireless network 100 and the private EV-DO wireless network 200. A terminal 210 in the private EV-DO wireless network 200 is a terminal registered in the public EV-DO wireless network 100 and can be also used in common in the private EV-DO wireless network 200.

Further, access network transceiver systems (ANTSs; public network base stations) 120*a*, 120*b* and 120*c* in the public EV-DO wireless network 100 have desired public wireless areas, respectively. When a terminal enters the area of ANTS (120*a*, 120*b*, 120*c*), the corresponding ANTS establishes a session and performs an operation needed upon allocating a unicast access terminal identifier (UATI) which is necessary for the corresponding AT 110. Further, the ANTS 120*a*, 120*b* and 120*c* allow the AT 110 to receive a call, or relay a call connection request signal to access network controls (ANCs) 130*a* and 130*b* when there is a call connection request from the AT 110.

The ANCs 130*a* and 130*b* are each connected to a global area network (GAN) 140 as a hub, and the GAN 140 in turn is connected to access network authentication accounting authorization (AN_AAA) 170, as a private authentication system, which is responsible for public network authentication, public network terminal authentication or the like, a packet data serving node (PDSN) 180 for performing Internet service for terminals, a data location register (DLR) 160 for storing information on terminals, location information of the terminals or the like, and a base system manager (BSM) 150 which is responsible for loading, failure, diagnosis, statistics or the like of a system. The GAN performs a data relay function between the respective nodes. Moreover, the ANTS 120*a*, 120*b* and 120*c* in the public EV-DO wireless network 100 may be directly connected to the GAN 140, but this is not shown in FIG. 1.

The PDSN 180 may be connected to other packet service nodes or to pPDSN 270 in the private EV-DO wireless network 200 over the Internet, but this is not shown.

The DLR 160 stores information (e.g., MN ID (IMSI) information) and location information of the terminals 110 and 210 registered in the public EV-DO wireless network 100, and provides the information of the terminals 110 and 210 upon updating the session of the corresponding terminal. The DLR 160 also stores information on terminals included in a typical wireless public network. Here, the terminal information of the typical wireless public network may include at least one of terminal information, user information, and service class information.

Meanwhile, ANTS 220 in the private EV-DO wireless network 200 provides an incoming call to the AT 210 entering the private area, or relays a call connection signal to a private access network control (PANC) 230 as a private control station when a call connection from the AT 210 is established.

The pANC 230 may include a router module 225 (the router module 225 can also be separate from the pANC 230) as a hub that determines, based on an identifier included in a data call originated by the AT 210, whether the originated data call is an originated call for connecting to the public network or an originated call for connecting to the private network, and that routes the originated call to the ANC 130 in the public EV-DO wireless network 100 when it is the originated call for the public network connection and routes the originated call to be handled in the private network EV-DO wireless network 200 when it is the originated call for the private network connection.

The router module 225 has a predetermined specific server address. The router module 225 compares this server address to temporary identifier information, and, when there is a call request to a temporary identifier terminal, having a particular server, of which the temporary identifier address is predefined, detects the call as a call in the private EV-DO wireless network 200 to route the corresponding call to the pANC 230.

For example, a temporary identifier of a private EV-DO wireless network 200 subscriber is allocated to have predetermined server addresses. If the predetermined server addresses are for example ones of a server for "samsung.co.kr", a DML server for "samsung.com" and the like, the terminal 210 in the private EV-DO wireless network 200 may have an address of "111@samsung.co.kr".

Thus, when a call connection of the AT 210 in the private EV-DO wireless network 200 to one of predetermined server addresses is requested or a call connection is requested with a terminal having the above server, for example, a terminal for "aaa@samsung.co.kr", it is detected as a call in the private EV-DO wireless network 200.

If any one of a server included in the temporary identifier of the AT 210 requesting a call, a server which is required to receive a call, and a temporary identifier server of a terminal which is required to receive a call does not have a predetermined address, the corresponding call is decided to be the public EV-DO wireless network 100 connection call and is routed to the ANCs 130*a* and 130*b* in the public EV-DO wireless network 100.

The pANC 230, which includes such a router module 225, stores location information and other authentication information of the private AT 210 and then provides the information needed to process the call when the call connection from the private EV-DO terminal AT 210 is established.

Further, to the pANC 230, a pPDSN 270 is connected for providing Internet service to the private EV-DO terminal AT 210 through an Intranet and a web server manager (WSM) 250 is also connected which is responsible for loading, failure, diagnosis, statistics or the like of the private EV-DO wireless network 200 system. Here, the above-described network components in the private EV-DO wireless network 200 are similar with the components used in the public EV-DO wireless network 100 in their nature and function.

However, the pDLR 240 in the private EV-DO wireless network 200 does not interwork with the public network DLR 160 and exists in the completely independent form. The private pAN_AAA 260 registers only terminals of which the usage of private EV-DO wireless network 200 service is permitted, and is responsible for the authentication of a corresponding terminal upon connection of the terminal to the private EV-DO wireless network 200.

In the end, the private EV-DO wireless network 200 in accordance with the present invention may be composed of the private control station pANC 230 for supporting the private EV-DO wireless network service, the pDLR 240 storing the location information and other information of the private EV-DO wireless network 200 AT 210, the pPDSN 270 for Internet services, and the pAN_AAA 260 for performing private terminal authentication.

The call processing operation of the private EV-DO wireless network system according to the present invention configured as above will be discussed in detail.

First, the private EV-DO wireless network 200, as shown in FIG. 1, is configured by adding the pANC 230 between the public network ANTS 120 (120*a* through 120*c*) and the public network ANC 130 (13*a* and 130*b*) and by adding network elements needed for the EV-DO service to the pANC 230.

One of important functions of the pANC 230 is to discriminate and deliver various messages from the private ANTS 220 to the public EV-DO wireless network 100 and to the private EV-DO wireless network 200. This is served by the router module 225 in the pANC 230, as described above.

For example, when the EV-DO wireless terminal AT 210 located in the private EV-DO wireless network 200 attempts to connect to the public EV-DO wireless network 100, the pANC 230 recognizes an identifier (discriminator) contained in a message which is sent from the private ANTS 220 and delivers the message to the public network ANC 130 so that the terminal AT 210 connects to the public EV-DO wireless network.

Further, when the terminal AT 210 desires to connect to the private EV-DO wireless network 200, the pANC 230, as in the public network, recognizes a discriminator contained in the message which is sent from the private ANTS 220 to enable the pANC 230 to support the private EV-DO wireless network 200 service using network elements disposed in the private area. For reference, the discriminator which can discriminate the private EV-DO wireless network 200 and the public EV-DO wireless network 100 is provided from the EV-DO wireless terminal AT 210.

The private EV-DO wireless network 200 of which the security is required is adapted to have a subnet and a color code (i.e., DLR discriminating factor) different from the public EV-DO wireless network 100.

Accordingly, when the terminal AT 210 enters the private EV-DO wireless network 200, the terminal AT 210, which enters the private EV-DO wireless network 200, recognizes the changed subnet and provides a UATI request message (UatiRequest Message) to the router module 225 through the private ANTS 220. The router module 225 routes the UATI request message, which is provided through the private ANTS 220, to the private pDLR 240 through the private pANC 230.

The private pDLR 240 closes the session of the existing public EV-DO wireless network 100, and creates and establishes a new session of the private EV-DO wireless network 200.

Once the private EV-DO wireless network 200 session with the corresponding AT 210 is again established by the private pDLR 240, the AT 210 is not allowed to respond to the paging from the public EV-DO wireless network 100. Even though the AT 210 attempts origination to the public EV-DO wireless network 100, the call connection will be failed since the session held by the public network DLR 160 and the session held by the AT 210 are different from each other.

Further, the router module 225 routes all of the session establishment related messages to the pANC 230 being a private control station to prevent the public EV-DO wireless network 100 session from being again established in the private EV-DO wireless network 200, such that the public EV-DO wireless network 100 connection call is originally blocked.

When a call connection from the AT 210 entering the private EV-DO wireless network 200 is established, the private authentication of the corresponding AT 210 is as follows. When receiving a unique ID (identification) value of the AT 210 called a network access identifier (NAI) from the AT 210, the pANC 230 accesses the pAN_AAA 260 to request the authentication with the NAI value received from the AT 210.

The pAN-AAA 260 authenticates that the corresponding AT 210 is a terminal registered in the private EV-DO wireless network 200 based on the NAI value of the AT 210 provided from the pANC 230.

If the authentication of the corresponding AT 210 through the pAN_AAA 260 is successful, a mobile node identifier (MN ID) value as a return value is provided to the corresponding AT 210.

An operator of the private EV-DO wireless network 200 will register in the pAN_AAA 260 the NAI value of the AT 210 to which the private EV-DO wireless network 200 service has been permitted.

That is, when the authentication is requested from the AT 210, the pAN_AAA 260 recognizes the NAI value of the AT 210 and, when it is the AT 210 registered in the private EV-DO wireless network 200, provides the MN ID value as a return value to the AT 210 to perform an authentication success process and, when the corresponding AT 210 is not registered in the private EV-DO wireless network 200, performs an authentication denial process.

In the end, a new session is produced and then authentication process in the pAN AAA 260 is completed only for the AT 210 registered in the private EV-DO wireless network 200, and the MN ID of the AT 210 is stored in the pDLR 240 along with the session information, such that the AT 210 is served by the private EV-DO wireless network 200.

Meanwhile, if the terminal is deviated from the private EV-DO wireless network 200 to the public EV-DO wireless network 100, it is served by the public EV-DO wireless network 100 through the above-stated process.

A method for processing a data call in a private EV-DO wireless network system according to the present invention, which corresponds to the above-stated operation of the apparatus for processing the data call in the private EV-DO wireless network system according to the present invention, will be discussed according to steps with reference to the accompanying drawings.

Figure 2:
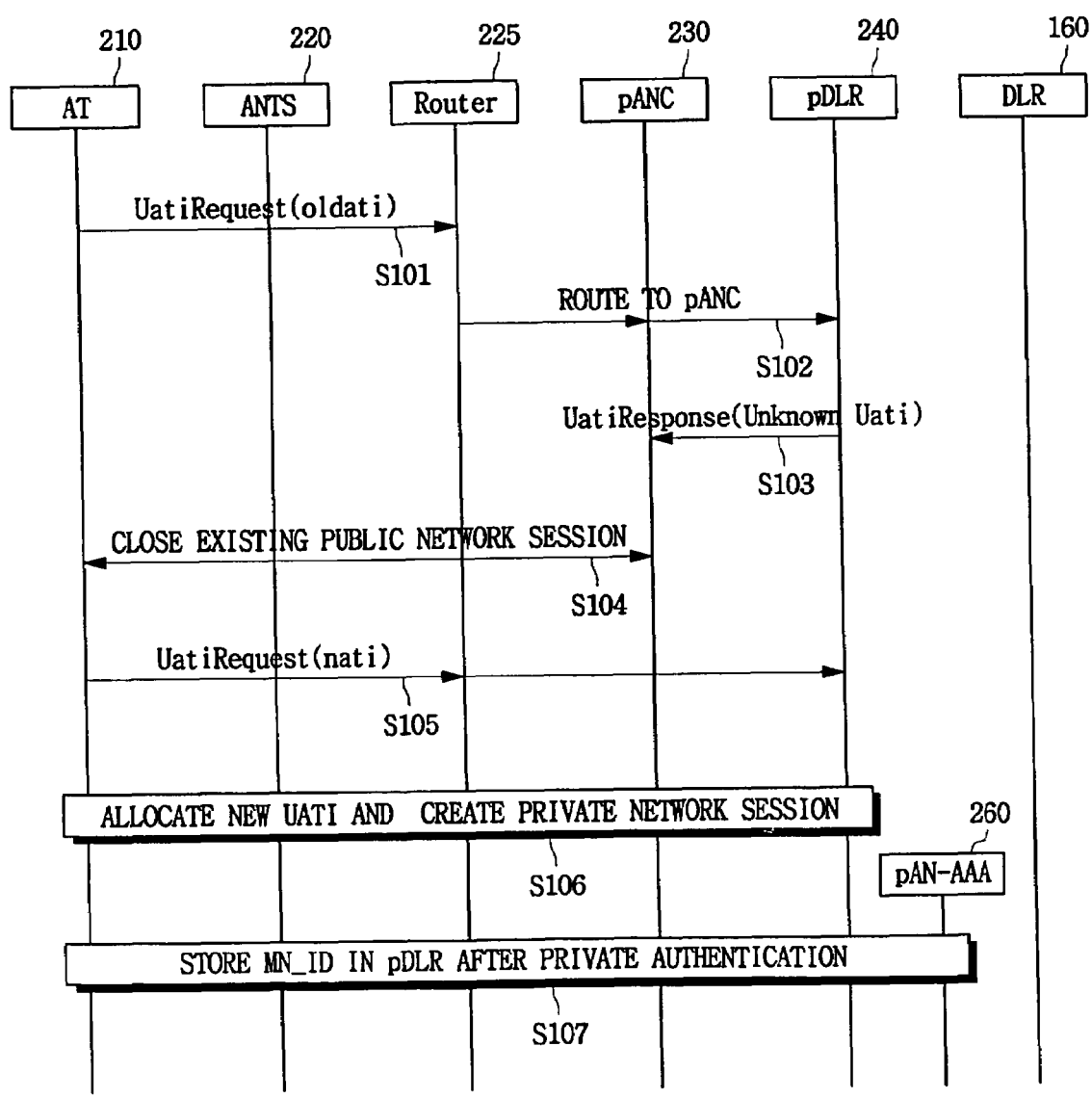
FIG. 2 is a view illustrating a private network session establishment process when a terminal enters a private network in a method for processing a data call in a private wireless high-speed data system according to the present invention.
Figure 3:
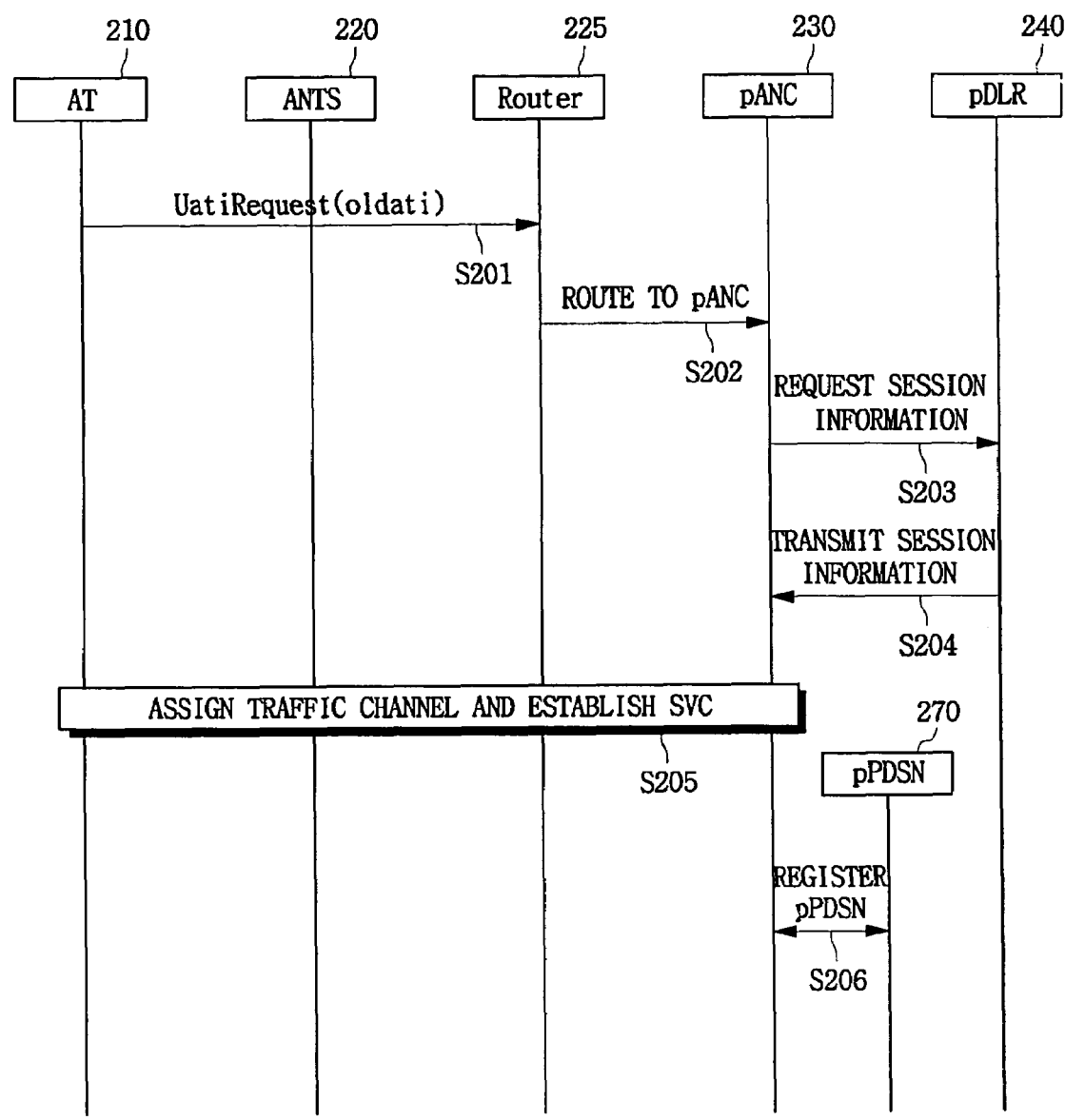
FIG. 3 is a view illustrating a procedure of call processing in a private network when there is a private network connection request from a terminal entering a private network in a method for processing a data call in a private wireless high-speed data system.
Figure 4:
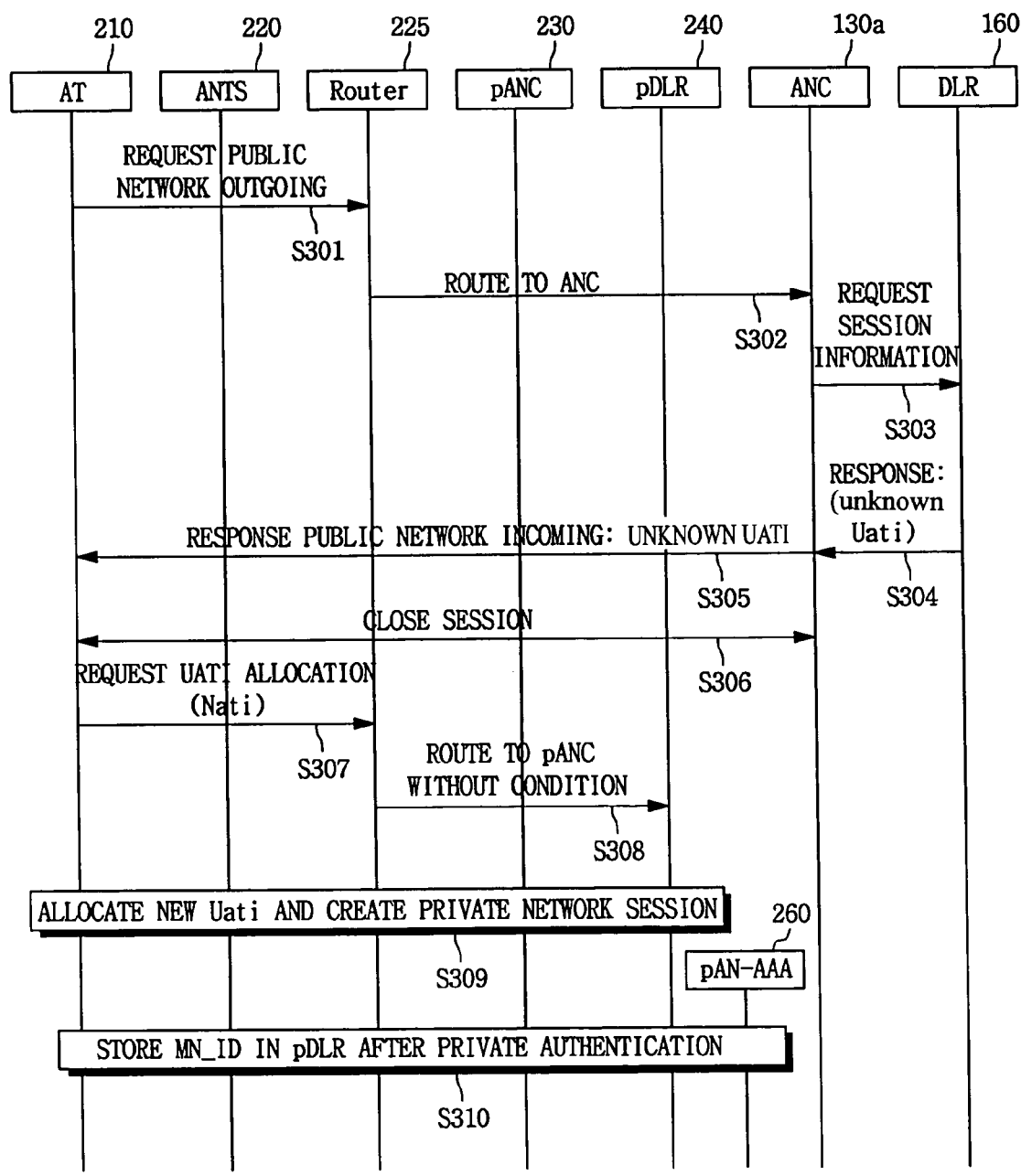
FIG. 4 is a view illustrating a procedure of call processing in a private network when there is a public network connection request from a terminal entering the private network in a method for processing a data call in a private wireless high-speed data system according to the present invention.

FIG. 2 is a view illustrating a private EV-DO wireless network session establishment process when a terminal enters a private EV-DO wireless network in a method for processing a data call in a private EV-DO wireless network data system according to the present invention, FIG. 3 is a view illustrating a procedure of call processing in a private EV-DO wireless network when there is a private EV-DO wireless network connection request from a terminal entering the private EV-DO wireless network in a method for processing a data call in a private EV-DO wireless network system, and FIG. 4 is a view illustrating a procedure of call processing in a private EV-DO wireless network when there is a private EV-DO wireless network connection request from a terminal entering the private EV-DO wireless network in a method for processing a data call in a private EV-DO wireless network system according to the present invention.

First, an establishment operation of a private EV-DO wireless network session with respect to the AT entering the private EV-DO wireless network will be discussed with respect to FIG. 2.

As shown in FIG. 2, if the AT 210 enters the private EV-DO wireless network 200, the AT 210 recognizes the changed subnet and loads oldati held by the AT 210, namely, an existing UATI value allocated in the public EV-DO wireless network 100 on a Uati request message (UatiRequest Message) to send it to the router 225 through the ANTS 220 as a private base station (S101).

The router 225 routes the UATI request message in which the oldati value of the AT 210 sent through the ANTS 220 is contained to the pANC 230, and the pANC 230 sends the UATI request message in which the oldati value of the AT routed through the router 225 is contained to the private pDLR 240 (S102).

The private pDLR 240 analyzes the oldati value of the AT provided by the pANC 230 to determine whether the corresponding oldati value is the UATI value allocated by the private pDLR.

If the UATI value of the AT provided from the pANC 230 is not the UATI value allocated by the private pDLR, that is, because the UATI value of the AT entering the private EV-DO wireless network 200 is a UATI value allocated by the public DLR 160, the private pDLR 240 rightly determines that it is not the UATI value allocated by the private pDLR.

Thus, because the UATI value of the AT provided from the pANC 230 is not the UATI value allocated by the pDLR 240, the pDLR 240 loads unknown UATI information indicating that it is not the UATI value allocated by the pDLR 240 on a UATI response message (UatiResponse Message) to send it as a return value to the private pANC 230 (S103).

The pANC 230 closes the session created in the AT 210 and the public EV-DO wireless network 100 based on the unknown UATI information loaded on the UATI response message sent from the pDLR 240 (S104).

If the session is closed, the AT 210 produces a random UATI value and reloads the produced random UATI value on the UATI request message (Uati Request(Nati:New UATI)) to send it to the pDLR 240 through the ANTS 220, the router 225 and the pANC 230 (S105).

The pDLR 240 allocates a new UATI according to the new UATI request message sent through the pANC 230 from the AT 210, and establishes the private EV-DO wireless network 200 session with the AT 210 to store it in its own database (S106).

After the private EV-DO wireless network 200 session is established with the AT 210, the pANC 230 provides a private authentication request message to the AT 210 to attempt the authentication between the AT 210 and the pAN_AAA 260.

The AT 210 provides authentication information to the pAN_AAA 260 through the pANC 230 in response to the authentication request message from the pANC 230, and the pAN_AAA 260 performs the private EV-DO wireless network 200 authentication according to the authentication information provided from the AT 210.

When the authentication of the corresponding AT 210 is successful as a result of the authentication, namely, when the corresponding AT 210 is the AT 210 registered in the private EV-DO wireless network 200, the pAN_AAA 260 provides the MN ID information of the corresponding AT 210 to the pDLR 240 through the pANC 230.

Accordingly, the pDLR 240 will finally store the MN ID information of the corresponding AT 210, provided from the pAN_AAA 260, in the database of the pDLR 240 (S107).

In the end, with the present invention, when the AT 210 enters the private EV-DO wireless network 200 of which the security is required, the session of the AT 210 with the existing public EV-DO wireless network 100 is closed, a new session with the private EV-DO wireless network 200 is established and is stored to allow the AT 210 to block the connection later upon connecting to the public EV-DO wireless network 100 through the private EV-DO wireless network 200. Further, if the AT 110 in the public EV-DO wireless network 100 attempts to connect to the private EV-DO wireless network 200 through the public EV-DO wireless network 100, the connection is blocked because the session of the public EV-DO wireless network 100 and the session of the private EV-DO wireless network 200 are different from each other.

That is, if the AT 210 enters the private EV-DO wireless network 200, a new session with the private EV-DO wireless network 200 is initiated and thus the AT can be served only by the private EV-DO wireless network 200.

A method for processing a call when the AT 210 attempts to connect to the private EV-DO wireless network 200 at the state where the corresponding AT 210 enters the private EV-DO wireless network 200 and a new session is established as described above will be discussed with reference to FIG. 3.

As shown in FIG. 3, if the AT 210 entering the private EV-DO wireless network 200 first requests a private EV-DO wireless network 200 connection, a call connection request signal (UatiRequest (oldati)) is provided to the router 225 through the ANTS 220 (S201).

The router 225 routes the call connection request signal from the AT 210, provided through the ANTS 220, to the pANC 230 (S202).

The pANC 230 determines based on the call connection request signal provided through the router 225 whether the corresponding call is a private EV-DO wireless network 200 connection call or a public EV-DO wireless network 100 connection call. If the corresponding connection call is the private EV-DO wireless network 200 connection call, the pANC 230 provides the pDLR 240 with a session information request signal for requesting session information necessary for the connection (S203). Here, a determination as to whether the corresponding call connection request signal is a public EV-DO wireless network 100 connection request signal or a private EV-DO wireless network 200 connection request signal is discriminated based on an identifier contained in the call connection request signal that is provided from the AT 210. That is, the AT 210 adds public EV-DO wireless network 100 connection identifier or private EV-DO wireless network 200 connection identifier information according to a user's selection upon generating the call connection request signal to provide it to the router 225 through the ANTS 220. Accordingly, the router 225 discriminates the private EV-DO wireless network 200 connection call and the public EV-DO wireless network 100 connection call based on the identifier information contained in the call connection request signal and routes the corresponding connection request signal.

The pDLR 240 retrieves the session information of the corresponding AT 210 from the database in response to the session information request signal provided from the pANC 230. That is, the pDLR 240 retrieves the session information of the corresponding AT 210 stored in the database through the session establishment process shown in FIG. 2 and provides the retrieved session information of the corresponding AT 210 to the pANC 230 (S204). Here, the MN ID information of the corresponding AT 210 is contained in the session information.

When the pANC 230 is provided with session information on the corresponding AT 210 from the pDLR 240, it allocates a traffic channel between the AT 210 and the pANC 230 according to the provided session information of the corresponding AT 210, such that data service establishment is made using the allocated traffic channel (S205).

Further, after allocating the traffic channel, the pANC 230 registers the corresponding AT 210 in the pPDSN 270 so that the private EV-DO service is performed through the pPDSN 270 (S206).

On the other hand, the pANC re-attempts the session establishment process shown in FIG. 2 when the session information of the corresponding AT 210 does not exist in the pDLR 240, and the pANC re-attempts the authentication process of FIG. 2 when the session information exists but the MN ID information of the corresponding AT 210 does not exist in the session information.

If the call connection request signal provided from the AT 210 is the public EV-DO wireless network 100 connection request signal rather than the private EV-DO wireless network 200 connection request signal in the step S203, the router 225 routes a corresponding call connection request signal to the ANC 130a in the public EV-DO wireless network 100.

Hereinafter, a procedure of call processing when the AT 210 entering the private EV-DO 11 wireless network 200 attempts to connect to the public EV-DO wireless network 100 will be discussed with reference to the accompanying FIG. 4.

First, if a call connection request signal is generated from the AT 210, which has entered the private EV-DO wireless network 200 as shown in FIG. 4, it is sent to the router 225 through the ANTS 220 (S301).

The router 225 analyses an identifier contained in the call connection request signal that has been sent from the AT 210 and determines whether the corresponding call is a private EV-DO wireless network 200 connection call or a public EV-DO wireless network 100 connection call. If the corresponding connection call is the public EV-DO wireless network 100 connection call, the router routes the corresponding call connection request signal to the ANC 130a in the public EV-DO wireless network 100 (S302).

The ANC 130a in the public EV-DO wireless network 100 provides to the public DLR 160 with a session information request signal to request session information of the corresponding AT 210 in response to the call connection request signal from the AT 210 routed through the router 225 in the private EV-DO wireless network 200 (S303).

The public DLR 160 analyzes the session information stored in the database of the public DLR 160 in response to the session information request signal provided through the ANC 130a. The DLR 160 provides an error response message (unknown Uati) to the ANC 130a because the session information of the corresponding AT 210 is not the session information allocated by the DLR (S304). That is, the DLR 160 sends an unknown UATI message, as a response message to the session information request message, to the AT 210 that has requested the connection through the ANC 130a (S305).

Thus, the AT 210 experiences the close with respect to the session with the public ANC 130a that the AT 210 is holding (S306).

If the AT 210 sends a UatiRequest message in order to re-initiate the session in the state where the session is closed (S307), a corresponding message is provided to the pANC 230 through the router (S308) and thus the public network session is not initiated but the private network session is re-initiated. Thus, even though the AT 210, which has entered the private EV-DO wireless network 200, re-attempts to connect to the public EV-DO wireless network 100, it will fail to connect to the public EV-DO wireless network 100 because of the above reason. Since the steps S309 and S310 have been described in FIG. 2, the explanation will be omitted herein.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 5:
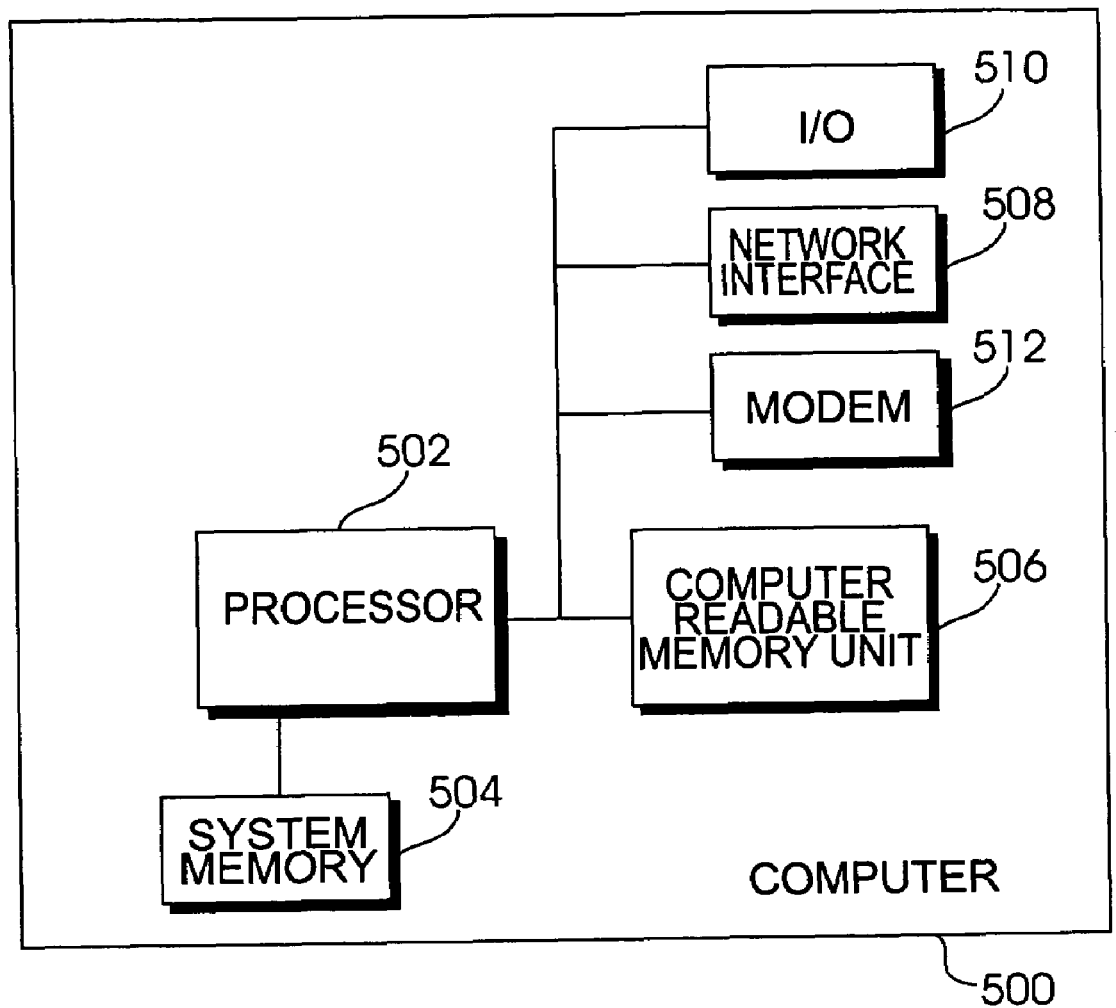
FIG. 5 shows an example of a computer including a computer-readable medium having computer-executable instructions for performing a technique of the present invention.

An example of a computer, but not limited to this example of the computer, that can read computer readable media that includes computer-executable instructions of the present invention is shown in FIG. 5. The computer 500 includes a processor 502 that controls the computer 500. The processor 502 uses the system memory 504 and a computer readable memory device 506 that includes certain computer readable recording media. A system bus connects the processor 502 to a network interface 508, modem 512 or other interface that accommodates a connection to another computer or network such as the Internet. The system bus may also include an input interface 510 that accommodates connection to a variety of other devices. FIG. 6 is an example of the data structure of the machine-readable medium of FIG. 5.

In the end, in the apparatus and method for processing a data call in the private EV-DO wireless network system according to the present invention, if a terminal enters a private EV-DO wireless network of which the security is required, an existing public network session is closed and a new private network session is initiated and thus the corresponding terminal is allowed to connect only to the private EV-DO wireless network, such that only the private EV-DO service is provided.

The above-described apparatus and method for processing a data call in the private EV-DO wireless network system according to the present invention independently constructs DLR and AN_AAA, which are essential to an EV-DO wireless network configuration, in a private EV-DO wireless network to block an EV-DO terminal from maintaining a public network session and allow the EV-DO terminal to maintain only a private network session within a private area in building the private EV-DO wireless network in an area where security is required, so that the public network connection is not established.

Thus, it is possible to prevent information outflow through the Internet with a public EV-DO wireless network connection, to limit private service with respect to a terminal having no permission, and to block in advance illegal information outflow through the Internet with a private EV-DO wireless network connection.

Although the preferred embodiments of the present invention have been disclosed for illustrative purposes, they are not intended to limit the scope of the present invention. Those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. An apparatus to process a data call in a private evolution data only wireless network system, the apparatus comprising:

a relay unit to relay a unicast access terminal identifier request message in response to a unicast access terminal identifier request message from a terminal entering the private evolution data only wireless network, the unicast access terminal identifier request message including a public network unicast access terminal identifier allocated in a public evolution data only wireless network;

a call processing unit to generate a new private evolution data only wireless network unicast access terminal identifier request signal in response to the unicast access terminal identifier request message from the relay unit, and to close a session created at the terminal and the public network according to the received message in response to a received unknown unicast access terminal identifier response message corresponding to the unicast access terminal identifier request signal, and to relay a new unicast access terminal identifier request message from the terminal through the relay unit, the new unicast access terminal identifier request message including random unicast access terminal identifier information, and to send an authentication request signal to the connection terminal through the relay unit in response to a private network session being established with the terminal according to a newly allocated unicast access terminal identifier; and a session information processing unit to send a unicast access terminal identifier response message to the call processing unit in response to the private evolution data only wireless network unicast access terminal identifier request signal from the call processing unit, and to allocate the new unicast access terminal identifier to the connection terminal according to the relayed new unicast access terminal identifier request message from the call processing unit to establish the private evolution data only wireless network session with the terminal, and to then store the established session information in a database thereof.

2. The apparatus according to claim 1, further comprising: an authentication unit connected to the call processing unit, to receive network access identifier information for authentication from the terminal through the call processing unit, and to determine authenticity based on the corresponding network access identifier information in accordance with whether the corresponding connection terminal is a terminal registered in the private evolution data only wireless network, and to send a mobile node identifier value as a return value to the terminal through the call processing unit and the relay unit, and to provide the mobile node identifier value of the connection terminal to the session information processing unit, the session information processing unit storing the mobile node identifier value of the connection terminal along with the session information in its database.

3. The apparatus according to claim 1, wherein the session information processing unit sends private evolution data only wireless network session information of the corresponding connection terminal stored in the database to the call processing unit in response to a call connection request signal being received from the terminal entering the private evolution data only wireless network and the new private network session having been established with the terminal.

4. The apparatus according to claim 1, wherein the call processing unit establishes a traffic channel to the corresponding connection terminal according to the private evolution data only wireless network session information of the connection terminal provided from the session information processing unit in response to a call connection request signal being received from the terminal entering the private evolution data only wireless network and the new private network session with the terminal having been established.

5. The apparatus according to claim 1, wherein the call processing unit comprises a routing module to determine, based on temporary identifier information contained in the call connection request signal, whether a corresponding terminal connection call is a private evolution data only wireless network connection call or a public evolution data only wireless network connection call in response to a call connection request signal being received through the relay unit from the terminal entering the private evolution data only wireless network and the new private network session with the terminal having been established, and to route the corresponding connection call to the private evolution data only wireless network or the public evolution data only wireless network according to the result of the determination.

6. The apparatus according to claim 1, further comprising:
a data packet service node to provide a data service over the Intranet in the private evolution data only wireless network to the corresponding terminal through the call processing unit in response to a traffic channel to the corresponding terminal being allocated from the call processing unit and call processing being implemented.

7. The apparatus according to claim 2, wherein the session information processing unit sends the private evolution data only wireless network session information of the corresponding connection terminal stored in the database to the call processing unit in response to a call connection request signal being received from the terminal entering the private evolution data only wireless network and the new private network session has been established with the terminal.

8. The apparatus according to claim 2, wherein the call processing unit establishes a traffic channel to the corresponding connection terminal in accordance with the private evolution data only wireless network session information of the connection terminal from the session information processing unit in response to a call connection request signal being received from the terminal entering the private evolution data only wireless network and the new private network session with the terminal having been established.

9. The apparatus according to claim 2, wherein the call processing unit comprises a routing module, the routing module determining whether a corresponding terminal connection call is a private evolution data only wireless network connection call or a public evolution data only wireless network connection call, based on temporary identifier information contained in the call connection request signal, in response to a call connection request signal being received through the relay unit from the terminal entering the private evolution data only wireless network and the new private network session with the terminal having been established, and the routing module routing the corresponding connection call to the private evolution data only wireless network or the public evolution data only wireless network according to the routing module determining result.

10. The apparatus according to claim 9, further comprising:
a data packet service node to provide a data service over the Intranet in the private evolution data only wireless network to the corresponding terminal through the call processing unit in response to a traffic channel to the corresponding terminal being allocated from the call processing unit and call processing being implemented.

11. The apparatus according to claim 2, further comprising:
a data packet service node to provide a data service over the Intranet in the private evolution data only wireless network to the corresponding terminal through the call processing unit in response to a traffic channel to the corresponding terminal being allocated from the call processing unit and call processing being implemented.

12. A method of processing a call in a private evolution data only wireless network system, the private evolution data only wireless network system being interfaced with a public evolution data only wireless network system including a public data location register, the private evolution data only wireless network system including a private base station, a private control station, a private data location register, a private authentication processor and a data service node, the method comprising:
the private base station sending a unicast access terminal identifier request message that has been sent from a terminal entering a private evolution data only wireless network to the private data location register through the private control station, the unicast access terminal identifier request message including a unicast access terminal identifier, allocated in the public evolution data only wireless network in response to the unicast access terminal identifier request message being received;
the data location register analyzing whether the unicast access terminal identifier included in the unicast access terminal identifier request message sent through the private control station is a unicast access terminal identifier allocated by the data location register, and sending to the private control station a unicast access terminal identifier response message for notifying that it is not the unicast access terminal identifier allocated by the data location register when it is not the unicast access terminal identifier allocated by the data location register;
the private control station receiving a unicast access terminal identifier response message sent from the private data location register closing a session created in the terminal and the public evolution data only wireless network in response to the received unicast access terminal identifier response message;
the private data location register allocating a new unicast access terminal identifier, establishing a private evolution data only wireless network session with the terminal, and storing the session in a database of the private data location register, in response to the unicast access terminal identifier request message including random unicast access terminal identifier information from the terminal being sent through the private base station and the private control station to the private data location register after the session has been closed; and
the private authentication processor performing private authentication of the terminal using a mobile node identifier value sent from the terminal in response to the new private network session being established, and then storing the mobile node identifier value of the corresponding terminal along with session information in the database of the private data location register.

13. The method according to claim 12, further comprising:
the private base station sending a call connection request signal from the terminal to the private control station in response to a call connection request from the terminal entering the private evolution data only wireless network and the private network session with the terminal having been established;

the private control station determining whether the call connection request signal sent from the private base station is a private evolution data only wireless network connection request signal or a public evolution data only wireless network connection request signal;

the private control station requesting session information to the private data location register in response to the connection request signal from the corresponding terminal being the private evolution data only wireless network connection request signal;

the private data location register retrieving session information of the corresponding terminal stored in the database of the private data location register to send the session information to the private control station; and the private control station allocating a traffic channel to the terminal using the session information sent from the private data location register, and performing data service over the allocated traffic channel.

14. The method according to claim 13, further comprising:

the private control station determining whether the call connection request signal sent from the private base station is a private evolution data only wireless network connection request signal or a public evolution data only wireless network connection request signal, and whether the call connection request signal sent from the private base station is the public evolution data only wireless network connection request signal, and the private control station sending the session information request signal of the corresponding terminal according to the call connection request signal to the data location register in the public evolution data only wireless network;

the public data location register determining whether the session information of the corresponding terminal is the session information allocated in the public evolution data only wireless network in response to the session information request sent through the private control station in the private evolution data only wireless network;

providing the private control station with a response message including an unknown unicast access terminal identifier, notifying that the session information of the corresponding terminal is not the session information allocated by the public evolution data only wireless network in response to the session information of the terminal not being the session information allocated in the public evolution data only wireless network; and the private control station closing the private network session with the terminal to block a connection to the public network in response to a response message provided from the data location register in the public evolution data only wireless network.

15. The method according to claim 12, further comprising:

the private base station sending a call connection request signal from the terminal to the private control station in response to a call connection request from the terminal entering the private evolution data only wireless network and the private network session with the terminal having been established; and the private control station determining whether the call connection request signal sent from the private base station is a private evolution data only wireless network connection request signal or a public evolution data only wireless network connection request signal.

16. The method according to claim 15, further comprising:

the private control station determining whether the call connection request signal sent from the private base station is a private evolution data only wireless network connection request signal or a public evolution data only wireless network connection request signal, and determining whether the call connection request signal sent from the private base station is the public evolution data only wireless network connection request signal, and the private control station sending the session information request signal of the corresponding terminal according to the call connection request signal, to the data location register in the public evolution data only wireless network.

17. The method according to claim 16, further comprising:

the public data location register determining whether the session information of the corresponding terminal is the session information allocated in the public evolution data only wireless network in response to the session information request sent through the private control station in the private evolution data only wireless network;

providing the private control station with a response message, unknown unicast access terminal identifier, notifying that the session information of the corresponding terminal is not the session information allocated by the public evolution data only wireless network in response to the session information of the terminal not being the session information allocated in the public evolution data only wireless network; and the private control station closing the private network session with the terminal to block a connection to the public network in response to a response message provided from the data location register in the public evolution data only wireless network.

18. A method of processing a call in a private evolution data only wireless network system, the method comprising:

receiving a unicast access terminal identifier request message from a terminal entering a private evolution data only wireless network, the unicast access terminal identifier request message including a unicast access terminal identifier, an old unicast access terminal identifier, allocated in a public evolution data only wireless network;

determining whether the old unicast access terminal identifier included in the received unicast access terminal identifier request message is a unicast access terminal identifier allocated in the private evolution data only wireless network;

closing a public evolution data only wireless network session established with the terminal in response to a determination that the unicast access terminal identifier included in the sent unicast access terminal identifier request message is not the unicast access terminal identifier allocated in the private evolution data only wireless network;

establishing a private evolution data only wireless network session with the terminal, and storing the session in a database in response to a unicast access terminal identifier request message including random unicast access terminal identifier information received from the terminal after the session has been closed, and allocating a new unicast access terminal identifier according to the received random unicast access terminal identifier information; and performing private authentication for the corresponding terminal using the received mobile node identifier of the terminal, and then storing the mobile node identifier value of the corresponding terminal along with the session information in the database in response to the new private evolution data only wireless network session being established, sending an authentication request signal to the terminal, and in response to a mobile node identifier value of the terminal needed for authentication being received from the terminal.

19. The method according to claim 18, further comprising:

determining whether a corresponding call connection request signal is a private evolution data only wireless network connection request signal or a public evolution data only wireless network connection request signal in response to a call connection request from the terminal entering the private evolution data only wireless network and a private session has been established with the terminal;

retrieving session information of the corresponding terminal stored in the database in response to a determination that the connection request signal from the corresponding terminal is the private evolution data only wireless network connection request signal; and allocating a traffic channel to the terminal according to the retrieved session information of the corresponding terminal and performing data service through the allocated traffic channel.

20. The method according to claim 18, further comprising: determining whether a corresponding call connection request signal is a private evolution data only wireless network connection request signal or a public evolution data only wireless network connection request signal in response to a call connection request from the terminal entering the private evolution data only wireless network and a private session has been established with the terminal.

21. The method according to claim 19, further comprising:

requesting the public evolution data only wireless network to provide a session information request signal of a corresponding terminal according to the call connection request signal in response to the call connection request signal from the terminal being the public evolution data only wireless network connection request signal; and closing the private network session with the terminal to block the connection to the public network in response to the response message provided from the public evolution data only wireless network upon receiving a response message from the public evolution data only wireless network indicating that the session information of the corresponding terminal is not the session information allocated in the public evolution data only wireless network in response to the request.

22. The method according to claim 19, further comprising:

requesting the public evolution data only wireless network to provide a session information request signal of a corresponding terminal according to the call connection request signal in response to the call connection request signal from the terminal being the public evolution data only wireless network connection request signal.

23. An apparatus to process a data call in a private wireless network system, the apparatus comprising:

a first unit to transfer a request message in response to the request message being received from a terminal entering a private wireless network, the request message including a public network unicast access terminal identifier allocated in a public wireless network;

a second unit to generate a new private wireless network request signal in response to the request message transferred by the first unit, and, in response to a response message, including an unknown unicast access terminal identifier, corresponding to the request signal has been received, closing a session created at the terminal and the public network according to the received message, and to transfer a new request message provided from the terminal through the first unit, the new request message including random unicast access terminal identifier information, and to send an authentication request signal to the connection terminal through the first unit in response to a private network session being established with the terminal according to a newly allocated unicast access terminal identifier; and a third unit to provide a response message to the call processing unit in response to the private wireless network request signal generated by the second unit, to allocate the new unicast access terminal identifier to the connection terminal according to the new unicast access terminal identifier request message transferred from the call processing unit to establish the private wireless network session with the terminal, and to then store the established session information in a database in a memory thereof.

* * * * *